US010515457B2

(12) United States Patent
Saito et al.

(10) Patent No.: US 10,515,457 B2
(45) Date of Patent: Dec. 24, 2019

(54) IMAGE COLLATION SYSTEM AND IMAGE COLLATION METHOD (71) Applicants: Kabushiki Kaisha Toshiba, Minato-ku (JP); Toshiba Infrastructure Systems & Solutions Corporation, Kawasaki-shi (JP)

(72) Inventors: Kota Saito, Kawasaki (JP); Yusuke Tazoe, Yokohama (JP); Hiroo Saito, Kawasaki (JP); Hiroshi Sukegawa, Yokohama (JP)

(73) Assignees: Kabushiki Kaisha Toshiba, Minato-ku (JP); Toshiba Infrastructure Systems & Solutions Corporation, Kawasaki-shi (JP)

(*) Notice: Subject to any disclaimer, the term of this patent is extended or adjusted under 35 U.S.C. 154(b) by 119 days.

(21) Appl. No.: 15/696,957

(22) Filed: Sep. 6, 2017

(65) Prior Publication Data
US 2018/0082439 A1 Mar. 22, 2018

(30) Foreign Application Priority Data

Sep. 20, 2016 (JP) ................................. 2016-183231

(51) Int. Cl.
*G06K 9/00* (2006.01)
*G06T 7/73* (2017.01)
(52) U.S. Cl.
CPC ............ *G06T 7/74* (2017.01); *G06K 9/00248* (2013.01); *G06T 2207/30201* (2013.01)
(58) Field of Classification Search
CPC combination set(s) only.
See application file for complete search history.

(56) References Cited

U.S. PATENT DOCUMENTS 9,195,883 B2 * 11/2015 Brewer .............. G06K 9/00302
9,858,474 B2 * 1/2018 Brewer .............. G06K 9/00302
(Continued)

FOREIGN PATENT DOCUMENTS

EP  1 291 807 A2  3/2003
EP  1 291 807 A3  3/2004
(Continued)

*Primary Examiner* — Jose L Couso
(74) *Attorney, Agent, or Firm* — Oblon, McClelland, Maier & Neustadt, L.L.P.

(57) ABSTRACT

An image collation system comprising:
a detection unit that detects an object from an image acquired by imaging a predetermined position using an imaging unit;
a tracking unit that tracks an object image of the same object;
a selection unit that calculates an evaluated value for each of the object images of the same object and selects the object image of which the evaluated value is equal to or greater than a predetermined value as a best shot image;
a collation unit that performs a collation process of collating the best shot image with a registered image and determining whether the object present at the predetermined position is a previously registered object; and
a display that displays a performance result of the collation process,
the image collation system including
a storage unit that stores the best shot image; and
a preparation unit that updates or re-prepares an evaluation expression that calculates the evaluated value.

19 Claims, 9 Drawing Sheets

(56) References Cited

U.S. PATENT DOCUMENTS

| | | | |
|---|---|---|---|
| 9,904,852 B2* | 2/2018 | Divakaran | G06K 9/00771 |
| 10,235,607 B2* | 3/2019 | Ohira | G06K 9/00221 |
| 2003/0039380 A1 | 2/2003 | Sukegawa et al. | |
| 2007/0177807 A1* | 8/2007 | Enomoto | G06K 9/00288 |
| | | | 382/224 |
| 2008/0247611 A1* | 10/2008 | Aisaka | G06K 9/00261 |
| | | | 382/118 |
| 2009/0231458 A1* | 9/2009 | Moriyama | G06K 9/00228 |
| | | | 348/222.1 |
| 2010/0118205 A1* | 5/2010 | Sohma | H04N 5/147 |
| | | | 348/700 |
| 2011/0135153 A1* | 6/2011 | Tsurumi | G06K 9/00295 |
| | | | 382/103 |
| 2011/0221890 A1* | 9/2011 | Yamashita | G06T 7/248 |
| | | | 348/135 |
| 2011/0305384 A1* | 12/2011 | Aoyama | G06K 9/00281 |
| | | | 382/159 |
| 2011/0311112 A1* | 12/2011 | Matsuyama | G06K 9/00281 |
| | | | 382/118 |
| 2013/0129160 A1 | 5/2013 | Yamada et al. | |
| 2013/0243278 A1 | 9/2013 | Saito et al. | |
| 2013/0266181 A1* | 10/2013 | Brewer | G06K 9/00302 |
| | | | 382/103 |
| 2015/0310261 A1 | 10/2015 | Lee et al. | |
| 2015/0347814 A1* | 12/2015 | Sheng | G06K 9/0061 |
| | | | 382/103 |
| 2016/0133021 A1 | 5/2016 | Gouda et al. | |
| 2016/0239712 A1* | 8/2016 | Kitano | G06K 9/00744 |
| 2017/0039419 A1* | 2/2017 | Shiiyama | G06K 9/00926 |
| 2017/0193681 A1* | 7/2017 | Nomoto | G06K 9/00228 |
| 2019/0163702 A1* | 5/2019 | Garg | G06F 16/7837 |

FOREIGN PATENT DOCUMENTS

| | | |
|---|---|---|
| EP | 3 013 043 A1 | 4/2016 |
| JP | 2001-273496 | 10/2001 |
| JP | 2005-242890 | 9/2005 |
| JP | 2013-196295 | 9/2013 |
| JP | 2013-210845 A | 10/2013 |
| JP | 5454233 | 3/2014 |
| JP | 5753966 | 7/2015 |
| RU | 2 578 806 C1 | 3/2016 |
| WO | WO 2014/203523 A1 | 12/2014 |

* cited by examiner

IMAGE COLLATION SYSTEM AND IMAGE COLLATION METHOD

CROSS-REFERENCE TO RELATED APPLICATIONS

This application is based upon and claims the benefit of priority from Japanese Patent Application No. 2016-183231, filed on Sep. 20, 2016, and the entire contents of which are incorporated herein by reference.

FIELD

Embodiments of the present invention relate to an image collation system and an image collation method.

BACKGROUND

A technique of collating a plurality of frames constituting a moving image, which is acquired by imaging a predetermined position such as an entrance of a room using an imaging unit, with images of objects such as persons who are previously registered and determining whether an object present at the predetermined position is a previously registered object is presented.

A technique of selecting an image, which satisfies predetermined conditions that eyes are not closed, an image is not affected by hand shaking, brightness is sufficient, and the like, from a plurality of images acquired by consecutively imaging a predetermined position at a high speed using an imaging unit and collating the selected image with images of previously registered objects is also presented.

However, in the technique of collating a plurality of frames with images of previously registered objects, a process of calculating similarity levels of the plurality of frames to the images of the previously registered objects takes time.

In the technique of collating an image satisfying predetermined conditions among a plurality of images with images of previously registered objects, the image satisfying the predetermined conditions may not be suitable for collation with the images of the previously registered objects.

DETAILED DESCRIPTION

Hereinafter, an example of a person collation system to which an image collation system and an image collation system according to embodiments are applied will be described.

First Embodiment

Figure 1:
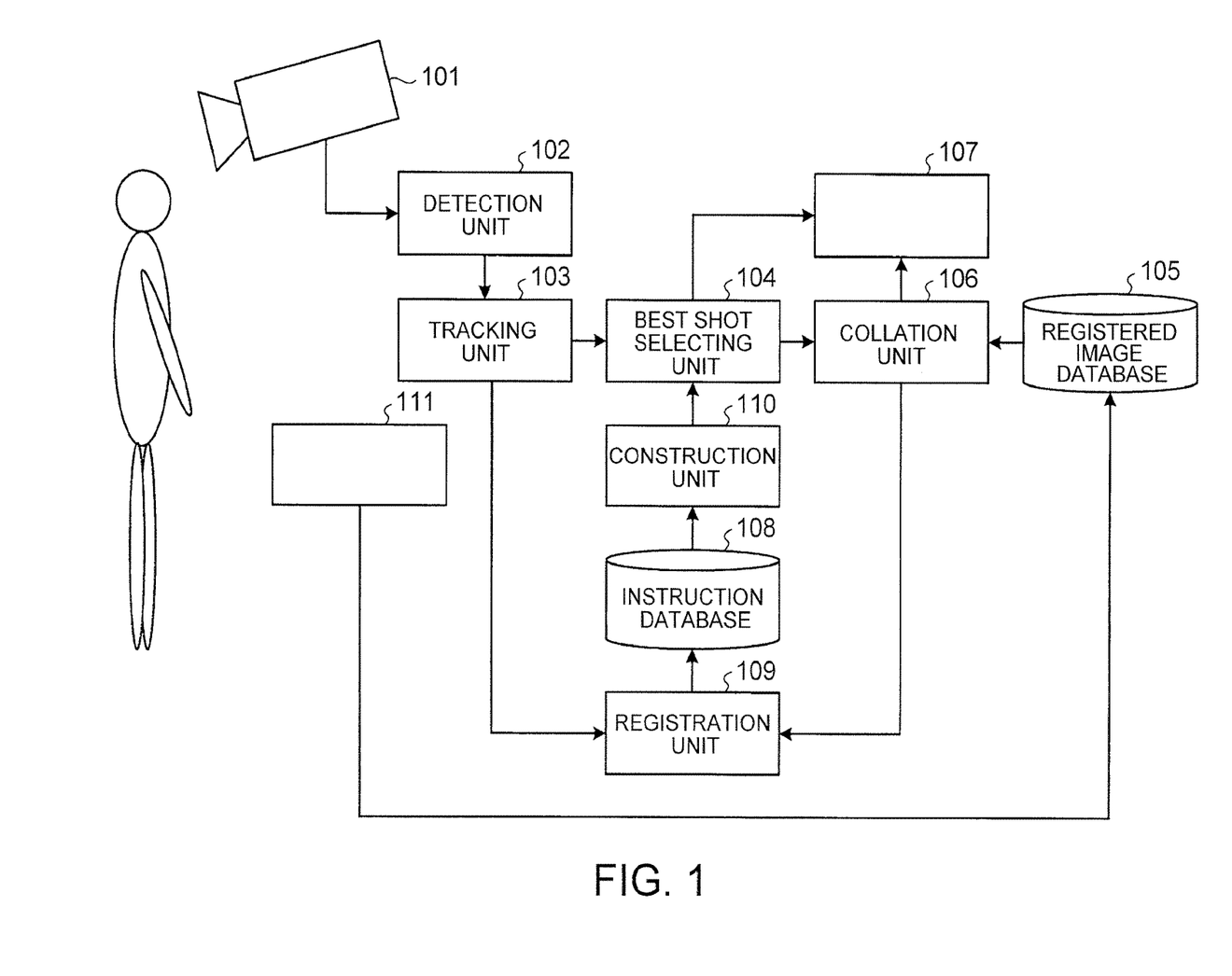
FIG. 1 is a diagram illustrating an example of a configuration of a person collation system according to a first embodiment.

FIG. 1 is a diagram illustrating an example of a configuration of a person collation system according to a first embodiment. As illustrated in FIG. 1, the person collation system according to this embodiment includes an image input unit 101, a detection unit 102, a tracking unit 103, a best shot selecting unit 104, a registered image database 105, a collation unit 106, a display unit 107, an instruction database 108, a registration unit 109, a construction unit 110, and an identification information input unit 111.

The image input unit 101 (image input device) is an imaging unit (imaging device) that is installed to image a predetermined position such as an entrance of, a building or a room. The detection unit 102 detects an image (hereinafter referred to as a person image which is an example of an object image) of a person (an example of an object) from each of a plurality of frames constituting a moving image acquired by imaging the predetermined position using the image input unit 101. The tracking unit 103 tracks (pursue) the person image of the same person in the plurality of frames constituting the moving image. The best shot selecting unit 104 calculates an evaluated value indicating a degree of suitableness of the person image for collation with registered images of previously registered persons (hereinafter referred to as a best shot evaluated value) using a predetermined evaluation expression (hereinafter referred to as a best shot evaluation expression) for each of the person images of the same person who is tracked by the tracking unit 103. Then, as a best shot image or images, the best shot selecting unit 104 selects the person image of which the best shot evaluated value is equal to or greater than a predetermined value among the person images of the same person tracked by the tracking unit 103. The registered image database 105 is a storage unit (storage) (memory) that stores a registered image which is an image of previously registered person.

The collation unit 106 performs a collation process of collating the best shot image selected by the best shot selecting unit 104 with the registered image stored in the registered image database 105 and determining whether a person passing through the predetermined position is a previously registered person. The display unit 107 (display) displays a result of the collation process which is performed by the collation unit 106. As an instruction data, the instruction database 108 stores the person image which is used to construct (generate) or update the best shot evaluation expression. As instruction data, the registration unit 109 stores the best shot image of a person who is determined to be a registered image among the best shot images into the instruction database 108. The construction unit 110 (an example of a preparation unit) updates or reconstructs (re-prepares) the best shot evaluation expression such that the best shot evaluated value of the person image which is suitable for collation with the registered image increases on the basis of the instruction data stored in the instruction database 108. The identification information input unit 111 is a reading unit that reads identification information for identifying a person passing through the predetermined position from an ID card or the like of the person.

Details of the units of the person collation system according to this embodiment will be described below with reference to FIG. 1. The image input unit 101 is a camera that is installed at a position at which a person passing through the predetermined position can be imaged from the front side to acquire a person image which is used for the collation process. The detection unit 102 detects a person image from frames constituting a moving image which is acquired through imaging by the image input unit 101. For example, the detection unit 102 prepares a template (hereinafter referred to as a face template) which is an average of images of a plurality of faces and which has a rectangular shape, in advance. The detection unit 102 scans each frame while moving, rotating, enlarging, or reducing the face template and detects an area in which a difference in luminance value from the face template is the smallest as a person image (for example, a face image).

The tracking unit 103 tracks a person image of the same person in a plurality of frames. For example, when an area in which a plurality of person images detected from a plurality of continuous frames overlap each other is equal to or greater than a predetermined area, the tracking unit 103 determines that the plurality of person images are the person images of the same person. On the other hand, when the area in which the plurality of person images detected from the plurality of continuous frames overlap each other is less than the predetermined area, the tracking unit 103 determines that the plurality of person images are person images of different persons and tracks person images of other person. When a position of a face does not vary much in the plurality of person images, there is a likelihood that the tracking unit 103 will continue to track the person images as the person images of the same person in spite of the person images of different persons. Accordingly, when person images of the same person are determined to be the person image of the same person for a predetermined number of time, the tracking unit 103 ends tracking of the person image of the person.

The best shot selecting unit 104 calculates a best shot evaluated value using a best shot evaluation expression for each of the person images which are determined to be the person images of the same person by the tracking unit 103. In this embodiment, the best shot selecting unit 104 selects one or two or more person images in which the calculated best shot evaluated value is equal to or greater than a predetermined value among the person images which are determined to be the person images of the same person. The registered image database 105 stores a registered image which is an image of a person who is permitted to pass through the predetermined position in correlation with identification information of the person.

The collation unit 106 performs a collation process of collating the best shot image selected by the best shot selecting unit 104 with a registered image (hereinafter referred to as a target person image) which is stored in correlation with identification information read by the identification information input unit 111 among the registered images stored in the registered image database 105. The display unit 107 is constituted by a liquid crystal display or the like and displays a result of the collation process which is performed by the collation unit 106. In this embodiment, the display unit 107 displays the target person image, the best shot image selected by the best shot selecting unit 104, and a collation result of the target person image with the best shot image by the collation unit 106.

The instruction database 108 (an example of a storage unit) (storage) (memory) stores the best shot image as instruction data in correlation with the best shot evaluated value calculated for the best shot image. The instruction database 108 may store a feature vector of the best shot image in correlation with the best shot evaluated value, instead of the best shot image. The instruction database 108 sequentially stores the best shot images in the descending order of the best shot evaluated values calculated for the best shot images.

The registration unit 109 stores, in the instruction database 108, the best shot image which succeeds in the collation process with the target person image among the best shot images selected by the best shot selecting unit 104 as instruction data in correlation with the best shot evaluated value calculated for the best shot image and the result of the collation process.

The construction unit 110 (an example of a preparation unit) updates or reconstructs the best shot evaluation expression using a predetermined mechanical learning algorithm on the basis of the instruction data stored in the instruction database 108. Accordingly, since it is not necessary to collate the registered image with the person images included in all the frames constituting a moving image acquired by imaging the predetermined position using the image input unit 101, it is possible to shorten the time required for the collation process. Further, since a person image suitable for collation with registered image is likely to be selected as a best short image, it is possible to improve collation accuracy with the registered image.

The identification information input unit 111 acquires information required for selecting a target person image. In this embodiment, the identification information input unit 111 is constituted by a reading unit (sensor) that is installed in a range which is reachable by a hand from a standing position of a person passing through the predetermined position and reads identification information for identifying a person passing through the predetermined position from an ID card or the like of the person. Here, the ID card may be a passport, a driver's license, or a national identification number card, or a recording medium having identification information recorded thereon. The identification information input unit 111 may be an input device that inputs identification information or a biometric information reading device that reads biometric information such as a fingerprint or a vein of a person passing through the predetermined position, instead of the reading unit.

Figure 2:
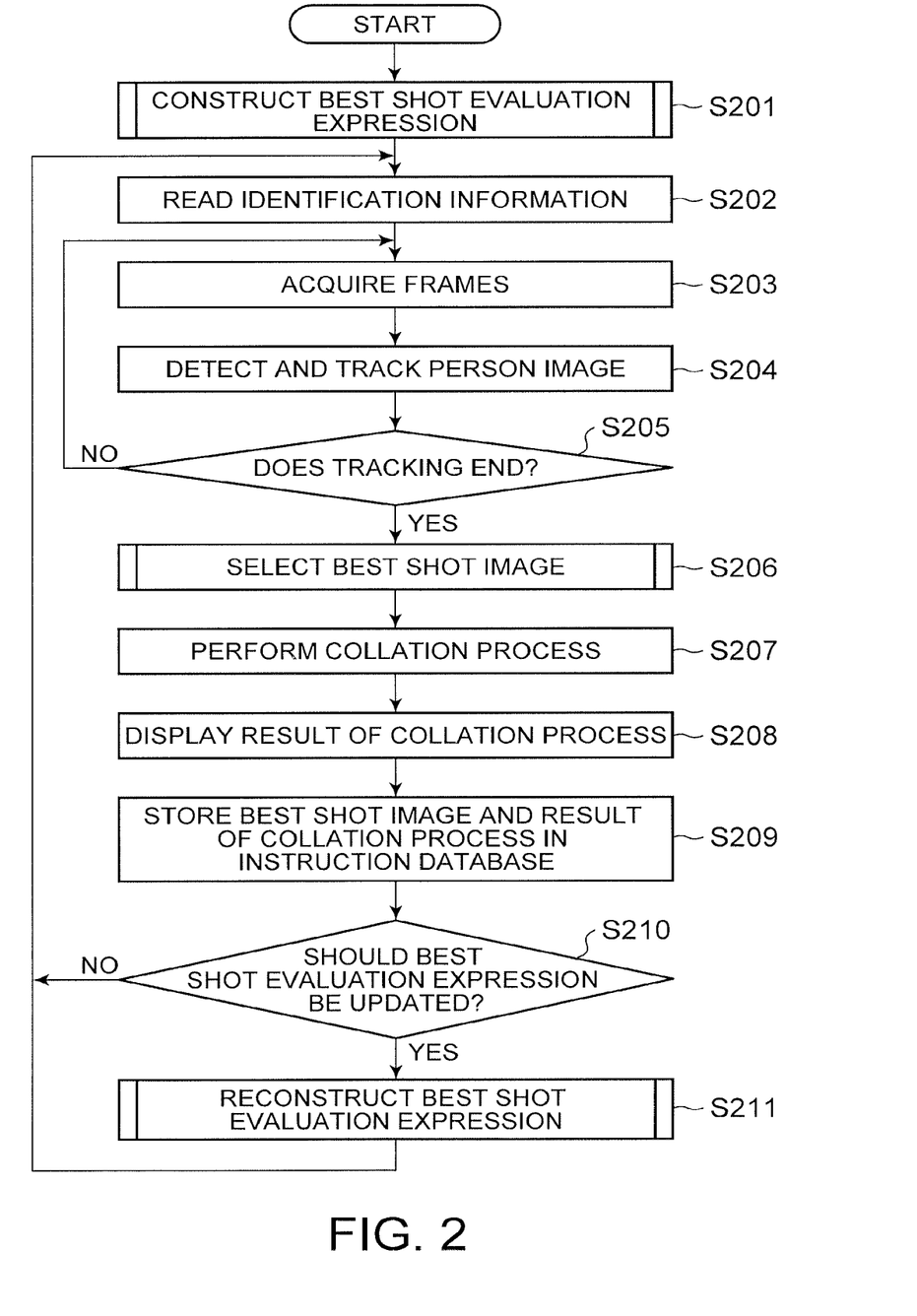
FIG. 2 is a flowchart illustrating an example of a flow of a collation process which is performed by the person collation system according to the first embodiment.
Figure 3:
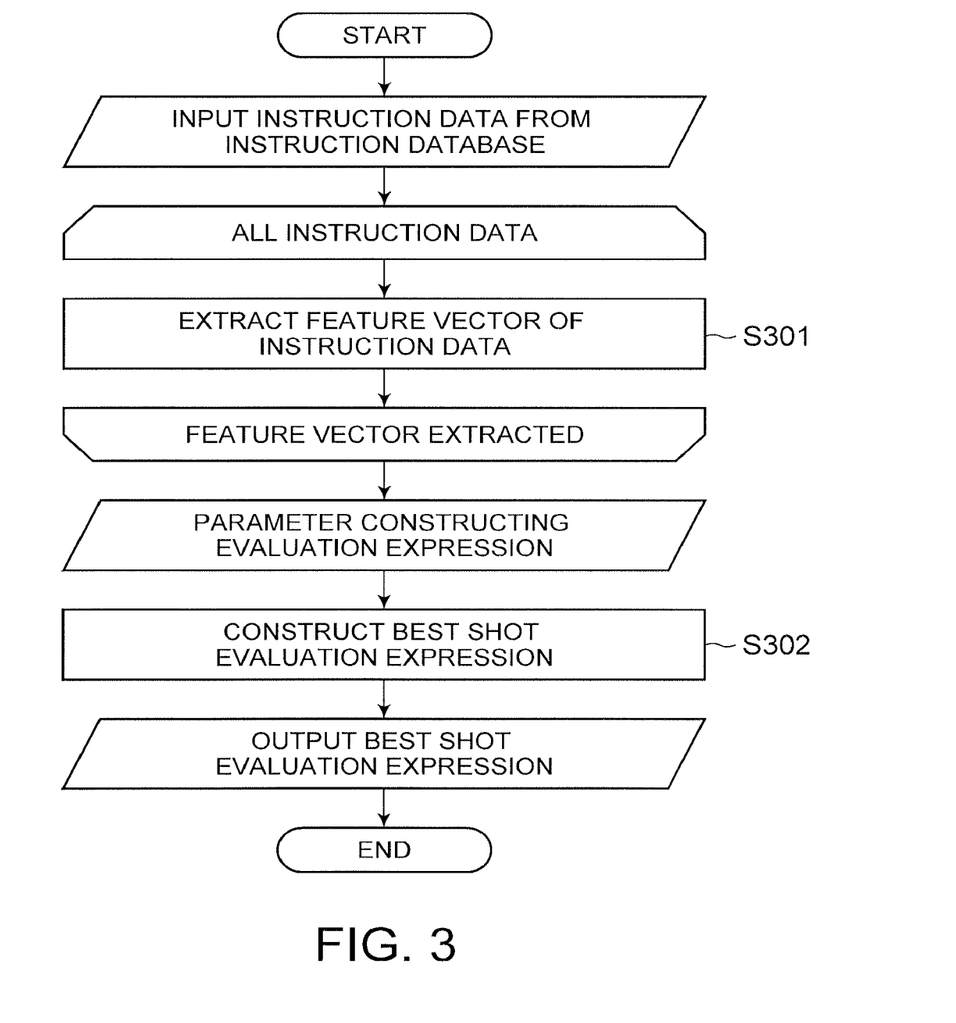
FIG. 3 is a flowchart illustrating an example of a flow of a best shot evaluation expression constructing process in the person collation system according to the first embodiment.
Figure 4:
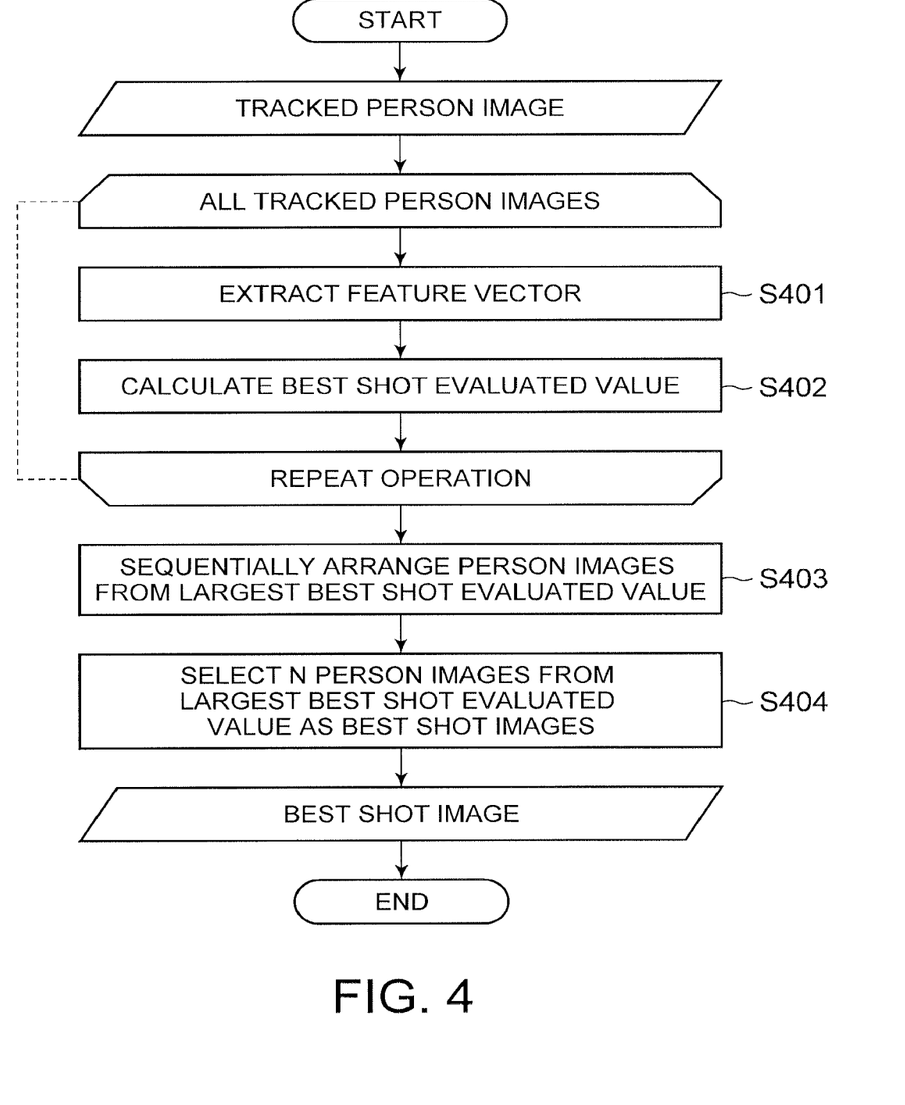
FIG. 4 is a flowchart illustrating an example of a flow of a best shot image selecting process in the person collation system according to the first embodiment.
Figure 5:
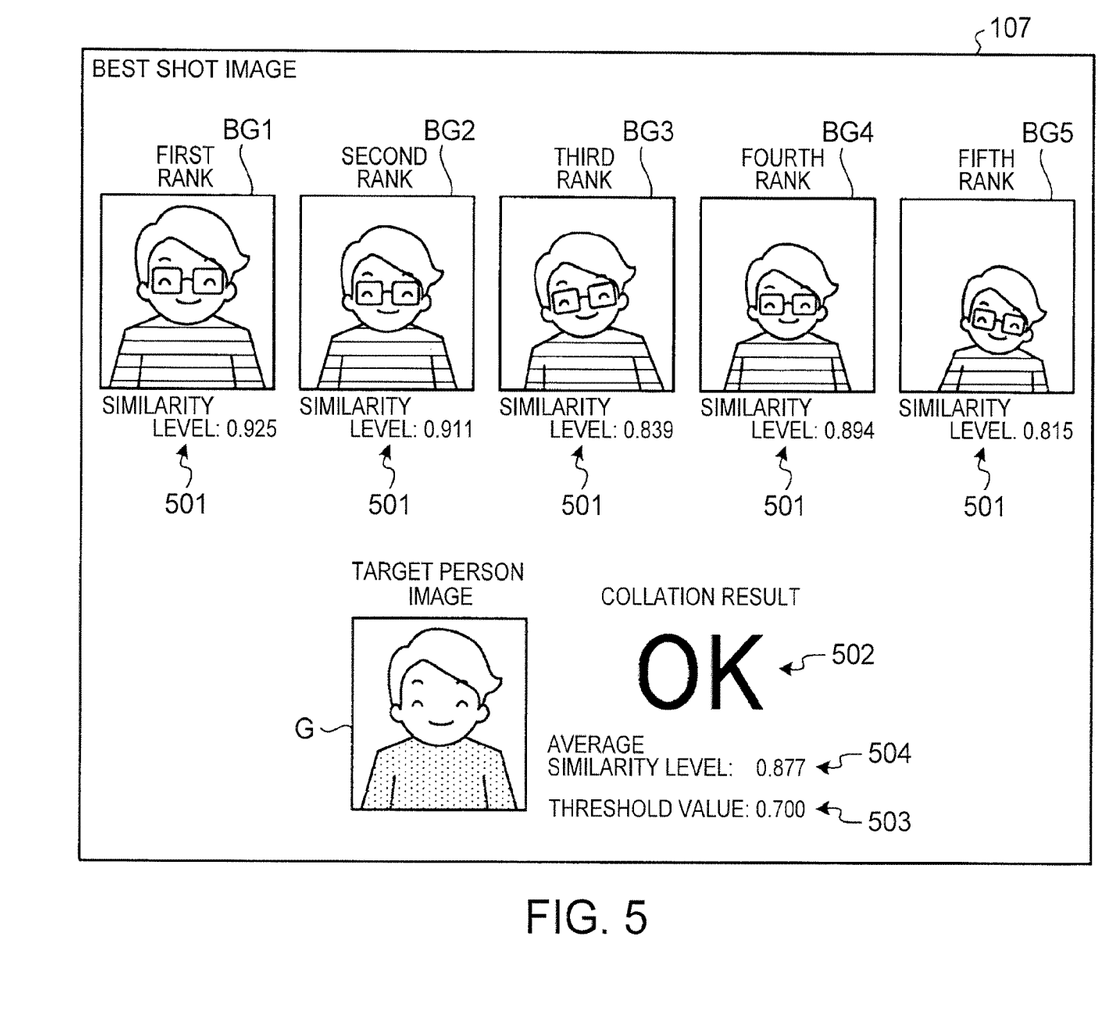
FIG. 5 is a diagram illustrating a display example of a result of the collation process in the person collation system according to the first embodiment.

An example of a flow of the collation process which is performed by the person collation system according to this embodiment will be described below with reference to FIGS. 2 to 5. FIG. 2 is a flowchart illustrating an example of a flow of the collation process which is performed by the person collation system according to the first embodiment. FIG. 3 is a flowchart illustrating an example of a flow of a best shot evaluation expression constructing process in the person collation system according to the first embodiment. FIG. 4 is a flowchart illustrating an example of a flow of a best shot image selecting process in the person collation system according to the first embodiment. FIG. 5 is a diagram illustrating a display example of a result of the collation process in the person collation system according to the first embodiment.

In this embodiment, the person collation system store instruction data in the instruction database 108 before performing the collation process. When the collation process is not performed yet and instruction data is not stored in the instruction database 108, the registration unit 109 stores, as instruction data in the instruction database 108, person image which are published over a network such as the Internet or captured images which are instructed by an external device among captured images acquired through imaging by the image input unit 101.

Subsequently, the construction unit 110 constructs a best shot evaluation expression on the basis of the instruction data stored in the instruction database 108 (step S201). Here, when the best shot evaluation expression is set in advance, the construction unit 110 may not construct the best shot evaluation expression.

The best short evaluation expression constructing process will be described below in detail with reference to FIG. 3. When instruction data is input from the instruction database 108, the construction unit 110 extracts feature vectors from all the input instruction data (step S301). Subsequently, the construction unit 110 constructs (prepares) a best shot evaluation expression in accordance with a predetermined mechanical learning algorithm using the extracted feature vectors as parameters (hereinafter referred to as evaluation expression construction parameters) which are used to construct the best short evaluation expression (step S302). Thereafter, the construction unit 110 outputs the constructed best shot evaluation expression to the best shot selecting unit 104.

For example, the construction unit 110 enlarges or reduces the instruction data input from the instruction database 108 to a rectangular image of m pixels×n pixels and extracts a luminance value of the rectangular image as a feature vector. Subsequently, the construction unit 110 constructs a best shot evaluation expression of regressing the feature vector to a best shot evaluated value using linear regression or the like.

Referring to FIG. 2 again, the identification information input unit 111 reads identification information from an ID card carried by a person passing through the predetermined position (step S202). When the identification information is read by the identification information input unit 111, the image input unit 101 starts imaging of the person passing through the predetermined position. The detection unit 102 acquires frames constituting a moving image which is acquired through imaging by the image input unit 101 (step S203). The detection unit 102 detects person images from the acquired frames (step S204). In the acquired frames, the tracking unit 103 tracks the person image of the same person as a person image detected from the previous frame (step S204). The tracking unit 103 determines whether to end tracking of the person images depending on whether the finally detected person image is the person image of the same person as the person image detected from the previous frame (step S205). When the finally detected person image is a person image of the same person as the person image detected from the previous frame, the tracking unit 103 determines not to end tracking of the person images (step S205: No). Then, the detection unit 102 acquires a new frame (step S203).

On the other hand, when the finally detected person image is a person image of another person other than the person image detected from the previous frame, the tracking unit determines to end tracking of the person images (step S205: Yes). Then, the best shot selecting unit 104 selects a best shot image from the person images determined to be the person images of the same person by the tracking unit 103 using the best shot evaluation expression (step S206).

The best shot image selecting process which is performed by the person collation system according to this embodiment will be described below in detail with reference to FIG. 4. FIG. 4 is a flowchart illustrating an example of a flow of the best shot image selecting process which is performed by the person collation system according to the first embodiment.

The best shot selecting unit 104 acquires the tracked person image of the same person whenever tracking of image of a person ends. Subsequently, the best shot selecting unit 104 extracts a feature vector of each acquired person image (step S401). Then, the best shot selecting unit 104 calculates a best shot evaluated value on the basis of the feature vector extracted from each person image using the best shot evaluation expression (step S402). The best shot selecting unit 104 repeatedly performs the processes of steps S401 and S402 on all the tracked person images of the same person.

When the best short evaluated values of all the tracked person images of the same person are calculated, the best shot selecting unit 104 arranges the tracked person images of the same person sequentially from the largest best shot evaluated value (step S403). Subsequently, the best shot selecting unit 104 sequentially selects N person images from the person image having the highest best shot evaluated value among the tracked person images of the same person as the best shot image (step S404). Alternatively, as described above, the best shot selecting unit 104 may select person image or images of which the best shot evaluated value is equal to or higher than a predetermined value among the person images which are determined to be the person images of the same person. Then, the best shot selecting unit 104 outputs the selected best shot images to the collation unit 106.

Referring to FIG. 2 again, the collation unit 106 performs a collation process of collating the best shot image selected by the best shot selecting unit 104 with the target person image stored in correlation with the identification information read by the identification information input unit 111 among the registered images stored in the registered image database 105 (step S207). For example, the collation unit 106 extracts feature vectors from the target person image and the best shot image. At this time, the collation unit 106 enlarges or reduces the target person image and the best shot image to rectangular images of m pixels×n pixels. Then, the collation unit 106 extracts, as feature vectors, luminance values of the target person image or the best shot image which is enlarged or reduced to the rectangular images.

When the feature vectors are extracted from the target person image and the best shot image, the collation unit 106 calculates a similarity level of the feature vector extracted from the target person image and the feature vector extracted from the best shot image. When there are a plurality of target person images and a plurality of best shot images, the collation unit 106 calculates the similarity level for all combinations of the target person images and the best shot images. When the calculated similarity level is greater than a predetermined threshold value, the collation unit 106 determines that the person passing through the predetermined position is a person who is identified by the identification information read by the identification information input unit 111. Here, the predetermined threshold value is a threshold value for the similarity level with which the person passing through the predetermined position is a person who is identified by the read identification information. On the other hand, when the calculated similarity level is equal to or less than the predetermined threshold value, the collation unit 106 determines that the person passing through the predetermined position is different from a person who is identified by the identification information read by the identification information input unit 111. When there are a plurality of target person images and a plurality of best shot images, the collation unit 106 may determine whether the person passing through the predetermined position is a person who is identified by the identification information read by the identification information input unit 111, depending on whether an average of the similarity levels calculated for all combinations of the target person images and the best shot images is greater than the predetermined threshold value.

Subsequently, the display unit 107 displays the result of the collation process which is performed by the collation unit 106 (step S208). In this embodiment, the display unit 107 displays information relevant to the collation process such as the best shot image, the target person image, the similarity level of the best shot image and the target person image, and the predetermined threshold value. For example, as illustrated in FIG. 5, the display unit 107 displays five best shot images BG1 to BG5 having the highest best shot evaluated value along with the similarity level 501 to the target person image calculated for each of the best shot images. As illustrated in FIG. 5, the display unit 107 displays the target person image G, the collation process result 502, and the predetermined threshold value 503. When there are a plurality of best shot images BG1 to BG5, the display unit 107 displays an average similarity level 504 which is an average of the similarity levels of the best shot images to the target person image G as illustrated in FIG. 5.

Referring to FIG. 2 again, the registration unit 109 stores the best shot image of which collation with the target person image succeeds among the best shot images as instruction data in the instruction database 108, in correlation with the collation process result of the corresponding best shot image with the target person image (for example, the similarity level of the best shot image to the target person image) (step S209). Subsequently, the construction unit 110 determines whether to update the best shot evaluation expression on the basis of the instruction data stored in the instruction database 108 (step S210). When the number of best shot images stored as instruction data in the instruction database 108 is greater than a predetermined number after the best shot evaluation expression is finally updated or reconstructed, the construction unit 110 determines to update the best shot evaluation expression (step S210: Yes). On the other hand, when the number of best shot images stored as instruction data in the instruction database 108 is equal to or less than a predetermined number after the best shot evaluation expression is finally updated or reconstructed, the construction unit 110 determines not to update the best shot evaluation expression (step S210: No).

When it is determined to update the best shot evaluation expression, the construction unit 110 updates or reconstructs the best shot evaluation expression on the basis of the best shot images stored as instruction data in the instruction database 108 after the best shot evaluation expression is finally updated or reconstructed (step S211). At this time, the construction unit 110 constructs the best shot evaluation expression in the same way as in the best shot evaluation expression constructing process illustrated in FIG. 3. When the best shot evaluation expression is updated, the construction unit 110 constructs the best shot evaluation expression, for example, using the finally constructed or updated best shot evaluation expression as an initial value. The construction unit 110 stores both the finally constructed or updated best shot evaluation expression and the best shot evaluation expression constructed on the basis of the best shot images stored as instruction data in the instruction database 108. The best shot selecting unit 104 may use an average (or a weighted average) of the best shot evaluated values calculated using the two best shot evaluation expressions as the best shot evaluated value of each person image. When imaging conditions of the image input unit 101 (for example, a frame rate, a resolution, a viewing angle, or illumination conditions) are changed after the best shot evaluation expression is finally updated or reconstructed or when the number of times in which the collation process fails is greater than a predetermined number of times after the best shot evaluation expression is finally updated or reconstructed, the construction unit 110 may update or reconstruct the best shot evaluation expression on the basis of the best shot images stored as instruction data in the instruction database 108. Accordingly, since the best shot evaluation expression can be updated or reconstructed such that a person image suitable for collation with the registered images is likely to be selected as the best shot image depending on a collation situation of person images, it is possible to improve collation accuracy of a person image with a registered image.

In the person collation system according to the first embodiment, since it is not necessary to collate the registered image with the person images included in all the frames constituting a moving image acquired by imaging the predetermined position using the image input unit 101 and it is possible to reduce a processing load of the collation process, it is possible to shorten the time required for the collation process. It is also possible to reduce capacity of a memory required for the collation process. Since a person image suitable for collation with a registered image is likely to be selected as a best short image, it is possible to improve collation accuracy of a person image with the registered image.

In this embodiment, the best shot selecting unit 104 may change the best shot evaluation expression which is used to calculate the best shot evaluated value depending on a person who is identified by the identification information read by the identification information input unit 111 or a day on which the collation process is performed. Specifically, the construction unit 110 constructs the best shot evaluation expression for each previously registered person or for each day. The best shot selecting unit 104 calculates the best shot evaluated value on the basis of the best shot evaluation expression of a person who is identified by the identification information read by the identification information input unit 111 or the best shot evaluation expression of a day on which the collation process is performed.

In this embodiment, the collation unit 106 stores a person image in the instruction database 108, which is other than the best shot image and which has the highest best shot evaluated value among the person images of the same person tracked by the tracking unit 103. When the number of person images which are other than the best shot images and which are stored in the instruction database 108 is equal to or greater than a predetermined number, the construction unit 110 may update or reconstruct the best shot evaluation expression on the basis of the person image other than the best shot images. Alternatively, the construction unit 110 may update or reconstruct the best shot evaluation expression on the basis of the person images which are other than the best shot images and which are stored in the instruction database 108 when brightness of the moving image acquired through imaging by the image input unit 101 changes or in accordance with an update instruction input from an external device. Accordingly, when collation accuracy of a person image with a registered image decreases, a person image suitable for collation with the registered image can be more easily selected as the best shot image and it is thus possible to improve the collation accuracy of a person image with the registered image.

Second Embodiment

In this embodiment, a person collation system collates a person image of a person passing through a passage or the like with a registered image. In the following description, the same elements as in the first embodiment will not be described.

Figure 6:
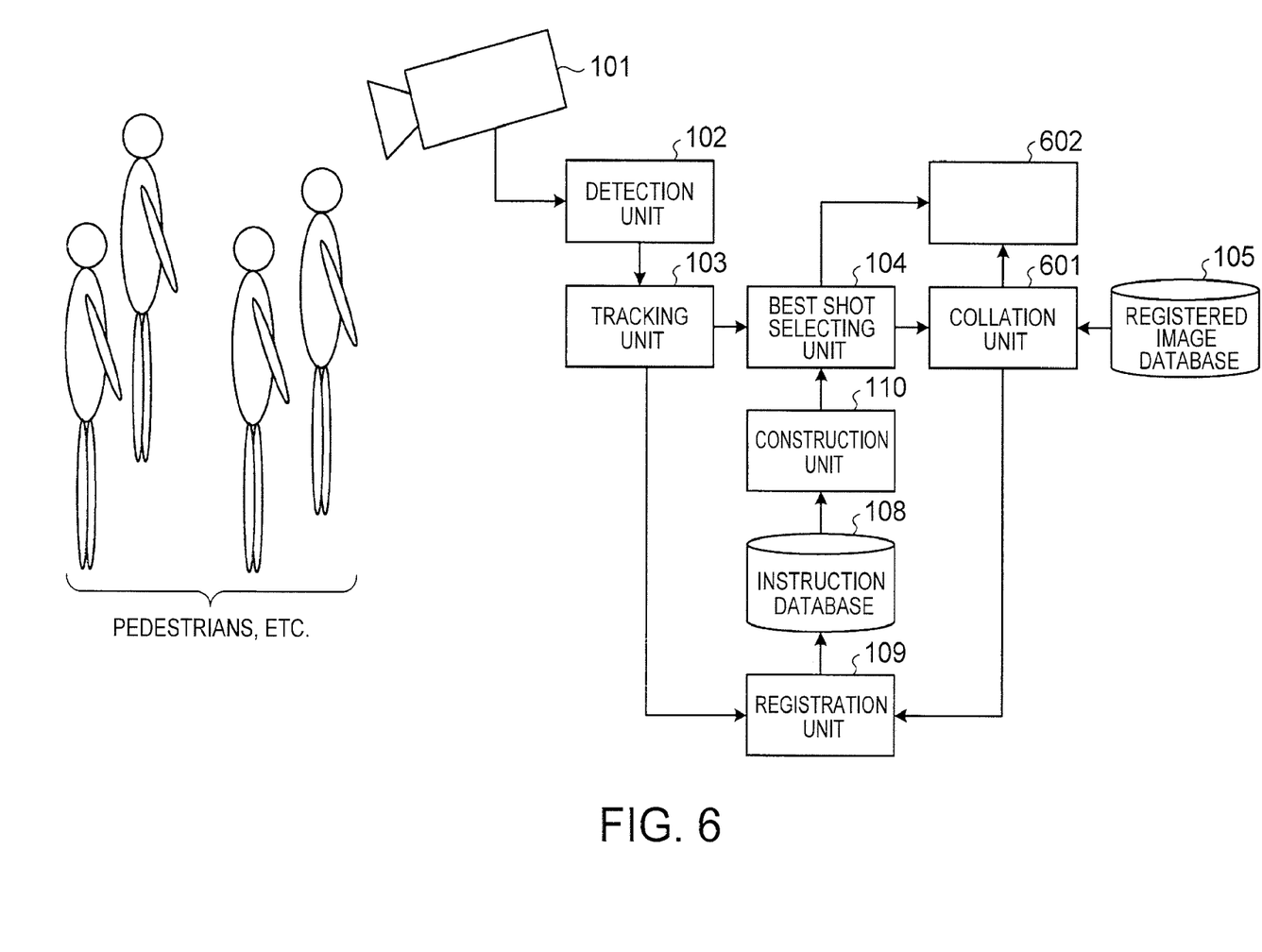
FIG. 6 is a diagram illustrating an example of a configuration of a person collation system according to a second embodiment.

FIG. 6 is a diagram illustrating an example of a configuration of a person collation system according to a second embodiment. As illustrated in FIG. 6, the person collation system according to this embodiment is different from the person collation system according to the first embodiment in that the identification information input unit 111 is not provided. In this embodiment, the image input unit 101 is installed to image a person passing through a passage or the like (an example of the predetermined position) to be monitored in a road or a building. For example, the image input unit 101 is installed on the ceiling of a position separated several tens of meters from a passage to be monitored so as to image the vicinity of the center of a floor of the passage to be monitored.

In this embodiment, the registered image database 105 stores an image of a person to be detected such as an image of a wanted person, an image of a person who is missing, or an image of a missing child as a registered image. A collation unit 601 performs a collation process of collating all registered images stored in the registered image database 105 as target person images with a best shot image or images selected by the best shot selecting unit 104. The collation unit 601 retrieves (searches) a registered image of which collation with the best shot image succeeds from the registered images stored in the registered image database 105. A display unit 602 displays the retrieval result of the registered image by the collation unit 601.

Figure 7:
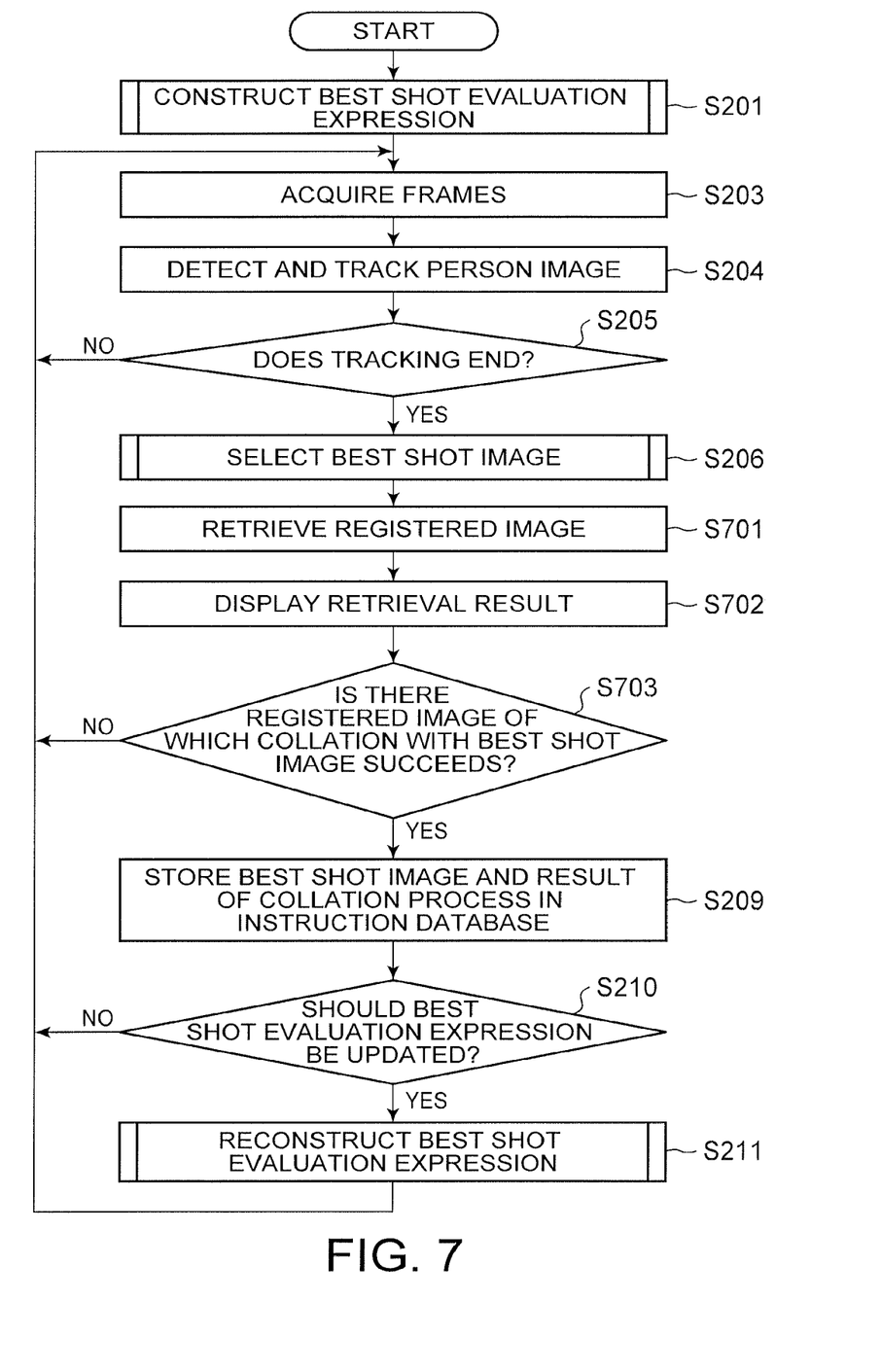
FIG. 7 is a flowchart illustrating an example of a flow of a collation process which is performed by the person collation system according to the second embodiment.

FIG. 7 is a flowchart illustrating an example of a flow of the collation process which is performed by the person collation system according to the second embodiment. In this embodiment, the collation unit 601 performs the collation process of collating the best shot image selected by the best shot selecting unit 104 with all the registered images stored in the registered image database 105 as the target person images as described above. The collation unit 601 retrieves the registered image of which collation with the best shot image succeeds from the registered images stored in the registered image database 105 (step S701). In this embodiment, the collation unit 601 retrieves a registered image of which a similarity level to the best shot image is greater than the predetermined threshold value from the registered images stored in the registered image database 105.

The display unit 602 displays the retrieval result of the registered image by the collation unit 601 (step S702). In this embodiment, the display unit 602 displays the best shot image and the retrieved registered image. When a registered image of which collation with the best shot image succeeds is not retrieved (step S703: No), the registration unit 109 does not store the best shot image in the instruction database 108. On the other hand, when a registered image of which collation with the best shot image succeeds is retrieved (step S703: Yes), the registration unit 109 stores the best shot image in the instruction database 108 as instruction data in correlation with the result of the collation process of the best shot image and the registered image (step S209).

In the person collation system according to the second embodiment, even when a person image of a person passing through a passage to be monitored is collated with registered images, the same operational advantages as in the first embodiment can be obtained.

Third Embodiment

In this embodiment, when collation of a best shot image with registered images fails, the best shot image is stored as a registered image in a registered image database. In the following description, the same elements as in the second embodiment will not be described.

Figure 8:
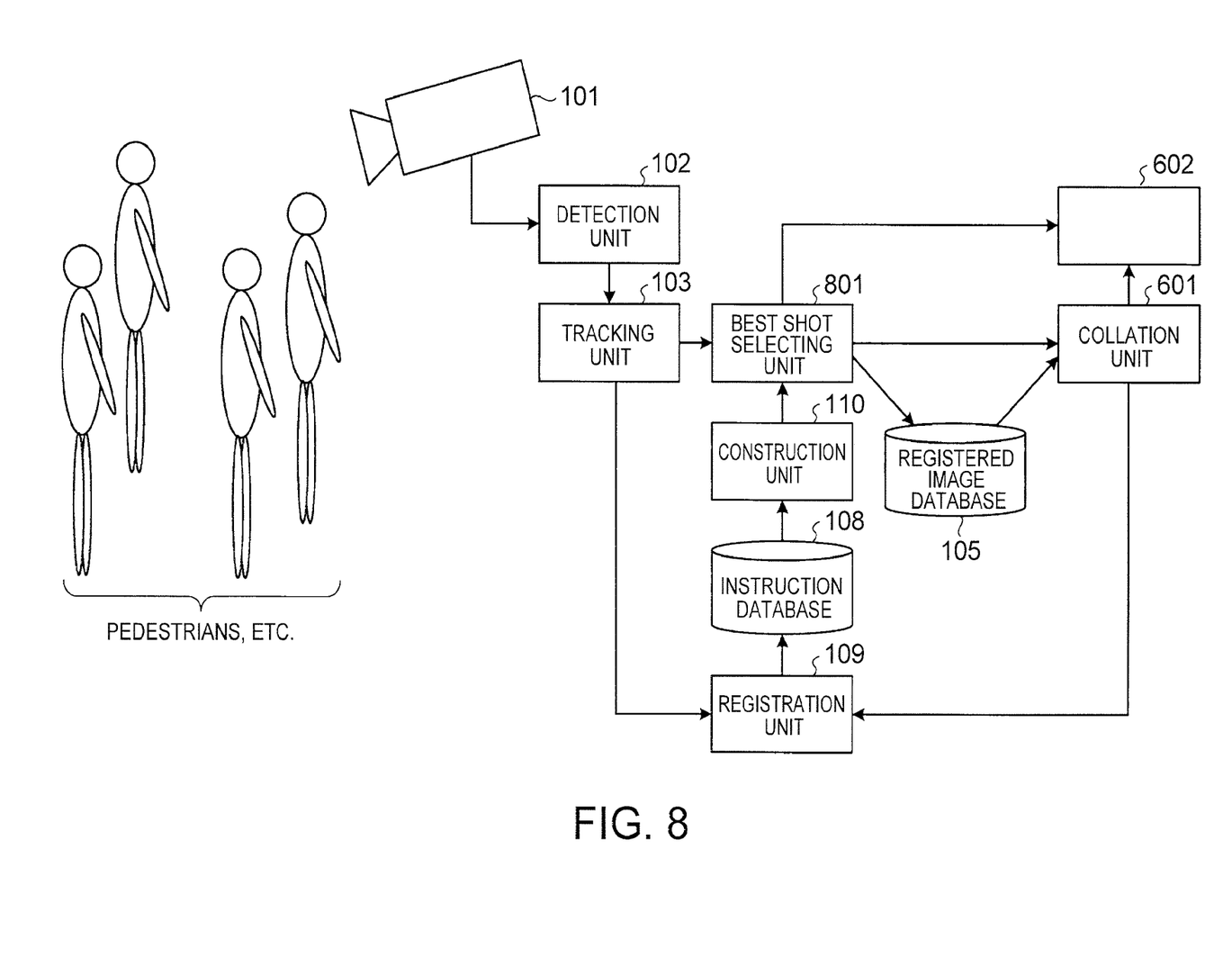
FIG. 8 is a diagram illustrating an example of a configuration of a person collation system according to a third embodiment.

FIG. 8 is a diagram illustrating an example of a configuration of a person collation system according to a third embodiment. As illustrated in FIG. 8, in this embodiment, when collation of a best shot image with registered images fails, a best shot selecting unit 801 stores the best shot image as a registered image in the registered image database 105. Accordingly, when a person imaged by the image input unit 101 passes a predetermined position again, it is possible to retrieve a registered image of which collation with a person image (a best shot image) acquired by imaging the person will succeed.

Figure 9:
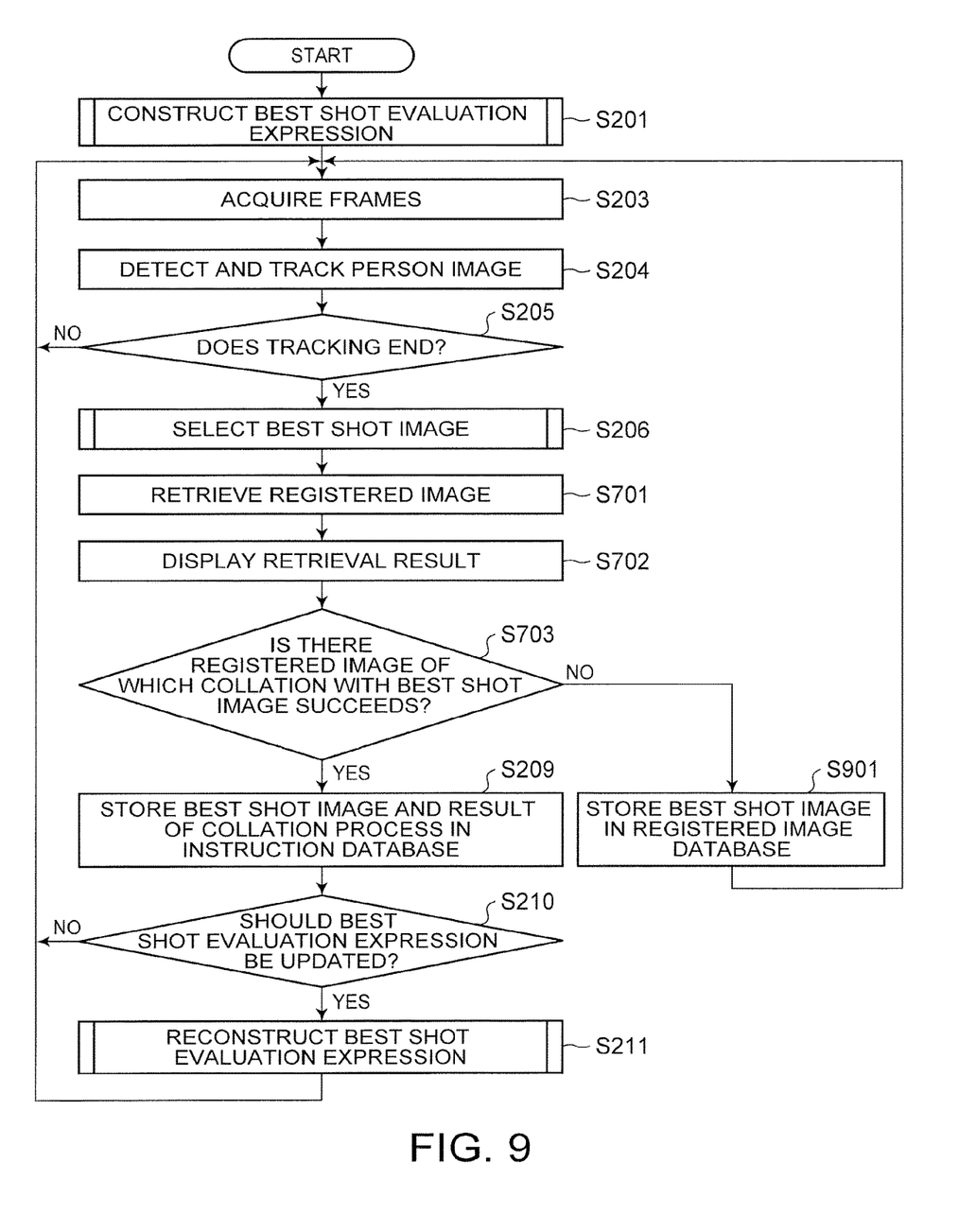
FIG. 9 is a flowchart illustrating an example of a flow of a collation process which is performed by the person collation system according to the third embodiment.

FIG. 9 is a flowchart illustrating an example of a flow of a collation process which is performed by the person collation system according to the third embodiment. In this embodiment, when it is determined in step S703 that a registered image of which collation with a best shot image succeeds is not retrieved (step S703: No), that is, when collation of a best shot image with registered images fails, the best shot selecting unit 801 stores the best shot image in the registered image database 105 as a registered image (step S901).

In the person collation system according to the third embodiment, when a person imaged by the image input unit 101 passes through the predetermined position again, it is possible to retrieve a registered image of which collation with a person image (a best shot image) acquired by imaging the person succeeds.

In this embodiment, the instruction database 108 and the registered image database 105 are used only in the system, but the invention is not limited thereto and they may be used in another person collation system. The registration unit 109 can set an upper limit of the number of pieces of instruction data which can be stored in the instruction database 108 and can sequentially delete (remove) instruction data having an oldest date and time at which the instruction data is stored in the instruction database 108 when the number of pieces of data stored in the instruction database 108 exceeds the upper limit.

In the person collation systems according to the first to third embodiments, an example in which a person image is collated with a registered image has been described, but the invention is not limited thereto. For example, the invention can be applied to a case in which vehicle bodies or number plates of automobiles or brand items are used as objects and an image of an object included in frames constituting a moving image acquired by imaging the object is collated with a registered image.

As described above, according to the first to third embodiments, since it is not necessary to collate the registered image with person images included in all the frames constituting a moving image acquired by imaging a predetermined position with the image input unit 101 and it is possible to reduce a processing load of the collation process, it is possible to shorten the time required for the collation process.

A program which is executed in the person collation system according to this embodiment is provided in a state in which the program is incorporated into a read only memory (ROM). The program which is executed by the person collation system according to this embodiment may be provided in a state in which it is recorded as a file of an installable format or an executable format on a computer-readable recording medium such as a CD-ROM, a flexible disk (FD), a CD-R, or a digital versatile disk (DVD).

The program which is executed by the person collation system according to this embodiment may be provided by storing the program in a computer connected to a network such as the Internet and downloading the program via the network. The program which is executed by the person collation system according to this embodiment may be provided or distributed via a network such as the Internet.

The program which is executed by the person collation system according to this embodiment is configured as a module including the above-mentioned units (the detection unit 102, the tracking unit 103, the best shot selecting unit 104 or 801, the collation unit 106 or 601, the registration unit 109, and the construction unit 110) and in actual hardware, the units are loaded onto a main memory device to realize the detection unit 102, the tracking unit 103, the best shot selecting unit 104 or 801, the collation unit 106 or 601, the registration unit 109, and the construction unit 110 in the main memory device by causing a central processing unit (CPU) to read and execute the program from the ROM.

Although some embodiments of the invention have been described above, the embodiments are presented as an example and it is not intended to limit the scope of the invention. The embodiments can be modified in various forms and can be subjected to various omissions, substitutions, and alternations without departing from the gist of the invention. Such embodiments or modifications are included in the scope or gist of the invention and are also included in the scope equivalent to the invention described in the appended claims.

What is claimed is:

1. An image collation system comprising:
    a detection unit that detects an object from an image acquired by imaging a predetermined position using an imaging unit;
    a tracking unit that tracks object images of the same object;
    a selection unit that calculates an evaluated value indicating a degree of suitableness of an image of a person for collation with registered images for each of the object images of the same object and selects the object image of which the evaluated value is equal to or greater than a predetermined value as a best shot image;
    a collation unit that performs a collation process of collating the best shot image with a registered image and determining whether the object present at a predetermined position is a previously registered object; and
    a display that displays a performance result of the collation process,
    the image collation system including
    a storage unit that stores the best shot image; and
    a preparation unit that updates or re-prepares a best shot evaluation expression using a predetermined mechanical learning algorithm based on instruction data stored in an instruction database such that an image suitable for collation with the registered images is selected as a best short image, and that calculates the evaluated value.

2. The image collation system according to claim 1, wherein
    the detection unit detects an object image of an object from a plurality of frames constituting a moving image which is acquired by imaging the predetermined position using the imaging unit.

3. The image collation system according to claim 1, wherein
    the tracking unit tracks the object image of the same object in a plurality of frames.

4. The image collation system according to claim 1, wherein
    the selection unit calculates an evaluated value which indicates a degree of suitableness of the object image for collation with a registered image of a previously registered object using a predetermined evaluation expression for each of the object images of the same object and selects the object image of which the evaluated value is equal to or greater than a predetermined value among detected object images as a best shot image.

5. The image collation system according to claim 1, wherein
    the storage unit stores the best shot image of the object which is determined to be the previously registered object among the best shot images.

6. The image collation system according to claim 1, wherein
    the preparation unit updates or re-prepares the evaluation expression such that the evaluated value of the object image which is suitable for collation with the registered image increases on the basis of the best shot image stored in the storage unit.

7. The image collation system according to claim 1, wherein
    the collation unit stores an object image which is other than the best shot image and which has a highest evaluated value among the object images of the same object in the storage unit, and
    the preparation unit updates or re-prepares the evaluation expression on the basis of an object image other than the best shot image when a number of object images other than the best shot image stored in the storage unit is equal to or greater than a predetermined number.

8. The image collation system according to claim 1, wherein
    the preparation unit updates or re-prepares the evaluation expression based on of the best shot image stored in the storage unit then a number of best shot images stored in the storage unit after the best-shot evaluation expression has finally been updated or re-prepared is greater than a predetermined number, when imaging conditions of the imaging unit are changed after the best-shot evaluation expression has finally been updated or re-prepared, or when a number of times in which collation of the best shot image with the registered image fails is greater than a predetermined number after the evaluation expression has finally been updated or re-prepared.

9. The image collation system according to claim 1, wherein the selection unit registers the best shot image as the registered image when collation of the best shot image with the registered image fails.

10. The image collation system according to claim 1, further comprising
a registered image database that previously registers the registered image.

11. The image collation system according to claim 1, further comprising
an identification information input unit for inputting an identification information of the object.

12. The image collation system according to claim 1, wherein
the image input unit monitors passing of an object to be detected.

13. The image collation system according to claim 1, wherein
the best shot image is stored in a registered image database when collation of the best shot image with the registered image fails.

14. An image collation method comprising:
detecting an object from an image acquired by imaging a predetermined position using an imaging unit;
tracking object images of the same object using a tracking unit;
calculating using a selection unit an evaluated value indicating a degree of suitableness of an image of a person for collation with registered images for each of the object images of the same object and selecting the object image of which the evaluated value is equal to or greater than a predetermined value as a best shot image;
performing a collation process of collating the best shot image with the registered image and determining whether the object present at a predetermined position is a previously registered object using a collation unit; and
displaying a performance result of the collation process using a display unit,
the image collation method including
storing the best shot image using a storage unit; and
updating or re-preparing a best shot evaluation expression using a preparation unit by a predetermined mechanical learning algorithm based on instruction data stored in an instruction database such that an image suitable for collation with the registered images is selected as a best short image, and that calculates the evaluated value.

15. The image collation method according to claim 14, wherein
detecting an object image of an object from a plurality of frames constituting a moving image which is acquired by imaging the predetermined position using the imaging unit.

16. The image collation method according to claim 14, wherein
tracking the object image of the same object in a plurality of frames.

17. The image collation method according to claim 14, wherein
calculating an evaluated value which indicates a degree of suitableness of the object image for collation with a registered image of a previously registered object using a predetermined evaluation expression for each of the object images of the same object and selecting the object image of which the evaluated value is equal to or greater than a predetermined value among detected object images as a best shot image.

18. The image collation method according to claim 14, wherein
storing the best shot image of the object which is determined to be the previously registered object among the best shot images.

19. The image collation method according to claim 14, wherein
updating or re-preparing the evaluation expression such that the evaluated value of the object image which is suitable for collation with the registered image increases on the basis of the best shot image stored in the storage unit.

\* \* \* \* \*